United States Patent
Gateau et al.

(10) Patent No.: US 6,958,924 B2
(45) Date of Patent: Oct. 25, 2005

(54) MULTI-CELL ENERGY CONVERSION DEVICE

(75) Inventors: Guillaume Gateau, Saint Pierre de Lages (FR); Thierry Antoine Meynard, L'Union (FR); Henri Simon Jacques Foch, Toulouse (FR)

(73) Assignee: Centre National de la Recherche Scientifique (C.N.R.S.), Paris (FR)

( * ) Notice: Subject to any disclaimer, the term of this patent is extended or adjusted under 35 U.S.C. 154(b) by 0 days.

(21) Appl. No.: 10/296,594

(22) PCT Filed: May 23, 2001

(86) PCT No.: PCT/FR01/01613

§ 371 (c)(1),
(2), (4) Date: May 20, 2003

(87) PCT Pub. No.: WO01/93412

PCT Pub. Date: Dec. 6, 2001

(65) Prior Publication Data

US 2004/0032757 A1 Feb. 19, 2004

(30) Foreign Application Priority Data

May 26, 2000 (FR) .............................. 00 06786

(51) Int. Cl.⁷ ............................................. H02M 3/06
(52) U.S. Cl. .............................. 363/62; 363/60; 363/132
(58) Field of Search ................................. 323/271, 272, 323/282, 288; 363/59, 60, 62, 132; 307/110

(56) References Cited

U.S. PATENT DOCUMENTS

| 3,596,369 A | 8/1971 | Dickerson et al. |
| 4,175,249 A | 11/1979 | Gruber |
| 5,737,201 A | 4/1998 | Meynard et al. |
| 6,879,503 B2 * | 4/2005 | Meynard et al. .............. 363/71 |

* cited by examiner

Primary Examiner—Gary L Laxton
(74) Attorney, Agent, or Firm—Young & Thompson (57) ABSTRACT

A device converting electric power between a voltage source and a current source, comprising several stages ($8_i$) of switching cells ($10_{i,k}$) comprising each two switches ($12_{i,k}$, $14_{i,k}$), capacitors ($20_{i,k}$) associated with the cells ($10_{i,k}$) arranged in a row ($18_k$) increasing from current source (4), control devices ($16_{i,k}$) each connected to a cell ($10_{i,k}$) and elements for monitoring the control devices ($16_{i,k}$). The stages ($8_i$) define two end groups and at least an intermediate group of switches, the two end groups comprising switches of each cell belonging respectively to the first and last stage connected in series, the intermediate group comprising pairs of switches ($12_{i,k}$, $14_{i-1,k}$) of cells belonging to two neighbouring stages connected in series. Furthermore, the capacitors ($20_{i,k}$, $20_{n,k}$) of a common row ($18_k$) are transversely connected in series between the two end groups.

19 Claims, 9 Drawing Sheets

MULTI-CELL ENERGY CONVERSION DEVICE

FIELD OF THE INVENTION

The present invention relates to a device for reversible conversion of electrical energy between a DC voltage source and a current source.

BACKGROUND OF THE INVENTION

More particularly, the invention relates to such a device comprising, on the one hand, switching cells each having two switches, each switch itself being constituted by at least one component forming a switch, and, on the other hand, capacitors associated with the switching cells and adapted to maintain between the homologous terminals of the two switches of each cell a load voltage equal to a fraction of the voltage of the voltage source, increasing as a function of its rank starting from the current source, and the homologous terminals of the switches situated at the end of the device close to the current source being "short-circuitable", and furthermore control devices each connected to a switching cell and adapted to control the switchings of the two switches of the cell whilst ensuring opposite states for them, as well as means for operating the control devices adapted to supply a reference signal adapted to the desired conversion.

Such a device for reversible conversion of electrical energy is described in the European Patent published under the number EP 0 555 432.

It comprises N switching cells, N being any whole number greater than or equal to 2. Each cell is composed of two switches which are controlled to have complementary states at each instant. N switches of the N cells are connected in series and constitute a first series of the device, the N other switches being connected in series and forming a second series of the device.

The two series of switches are interconnected, on the one hand, by a common extremity to a current source and, on the other hand, by their opposite extremities to the terminals of a voltage source.

A capacitor which is connected between the symmetrical terminals of the two switches of the cell concerned is associated with each switching cell. The cell closest to the voltage source may be associated with a specific capacitor in the hypothetical case in which the voltage source is not an ideal source in order to compensate for these imperfections.

In the contrary case, the perfect voltage source plays the role of capacitor with regard to this cell.

Each capacitor has as its function to maintain a voltage known as a capacitor load voltage at its terminals.

A distribution of these load voltages proportional to the rank k of each capacitor, $$V_{C_k} = \frac{kV}{N},$$

V being the voltage at the terminals of the voltage source, assures at the terminals of the blocked switches a voltage difference equal to $$\frac{V}{N}$$

for all the blocked switches. Thus each capacitor is chosen so as to present a behaviour under voltage as an increasing function of its rank, greater than the value $$\frac{kV}{N}.$$

In addition, control logics can be synchronised in such a way that the ripple of the output voltage of the device has an amplitude equal to $$\frac{V}{N}$$

and a frequency equal to NF, where F is the switching frequency of the switching cells.

This output voltage is the voltage between the terminal of the voltage source situated at the lowest potential and the terminal of the current source connected to the conversion device.

However, we are witnessing nowadays the development of high-powered electrical energy conversion devices for increasingly high voltage levels of the voltage source. This voltage increase leads indirectly to an increase in the size of the capacitors of the device which have to support increasingly substantial fractions of this voltage. Also nowadays, above 6 kV the price and the volume of the device tend to become prohibitive.

SUMMARY OF THE INVENTION

The invention seeks to remedy these drawbacks of the conventional device described previously by creating a device for reversible conversion of electrical energy which is capable of extending the field of use of high-powered conversion devices towards increasingly high voltage levels whilst permitting a substantial reduction in its volume and retaining the properties of the converter described in the publication EP 0 555 432 which are set out above.

Therefore the invention relates to a device for reversible conversion of electrical energy of the aforesaid type, characterised in that it comprises at least two parallel-connected stages each having at least two cells and at least one capacitor, the said stages defining two end groups of switches and at least one intermediate group of switches common to two successive stages, the two end groups each comprising switches of each cell belonging respectively to the first and to the last series-connected stages, the intermediate group comprising pairs of switches of cells belonging to two neighbouring series-connected stages, and that the capacitors are connected transversely in series between the two end groups.

The device for reversible conversion of electrical energy according to the invention may also have one or more of the following characteristics:

the intermediate group comprises series-connected switches of cells belonging alternately to two neighbouring stages, the said switches being unidirectional in voltage and bidirectional in current;

the two switches of each of the said pairs are connected in parallel and are bidirectional in voltage and unidirectional in current;

the components forming switches are all identical and each switch is constituted by series-connected components, the number of which is a function of the maximum voltage applicable between its terminals;

the operating means include means for processing the reference signal so as to deliver at the output a plurality of secondary reference signals, and means for transmission of each secondary reference signal to all the switching cell control devices of one and the same stage;

the processing means are adapted to deliver a plurality of secondary reference signals of which the sum of the values at each instant is proportional to the value of the reference signal, each secondary reference signal of a stage situated, on the voltage source side, between two given potential levels having at each instant a value higher than the value of a secondary reference signal of a stage situated, on the voltage source side, between two higher potential levels;

the device has two stages;

the part of the device situated between the two capacitors closest to the current source and the current source itself includes two components forming series-connected switches on each of the first and last groups and two diodes connected, on the one hand, at a point situated between the said two capacitors and, on the other hand, at a point situated between the said two components of the first and last groups respectively;

each stage includes two switching cells; and each stage includes three switching cells.

BRIEF DESCRIPTION OF THE DRAWINGS

The invention will be better understood with the aid of the following description which is given by way of example with reference to the accompanying drawings, in which.

DETAILED DESCRIPTION OF THE INVENTION

Figure 1:
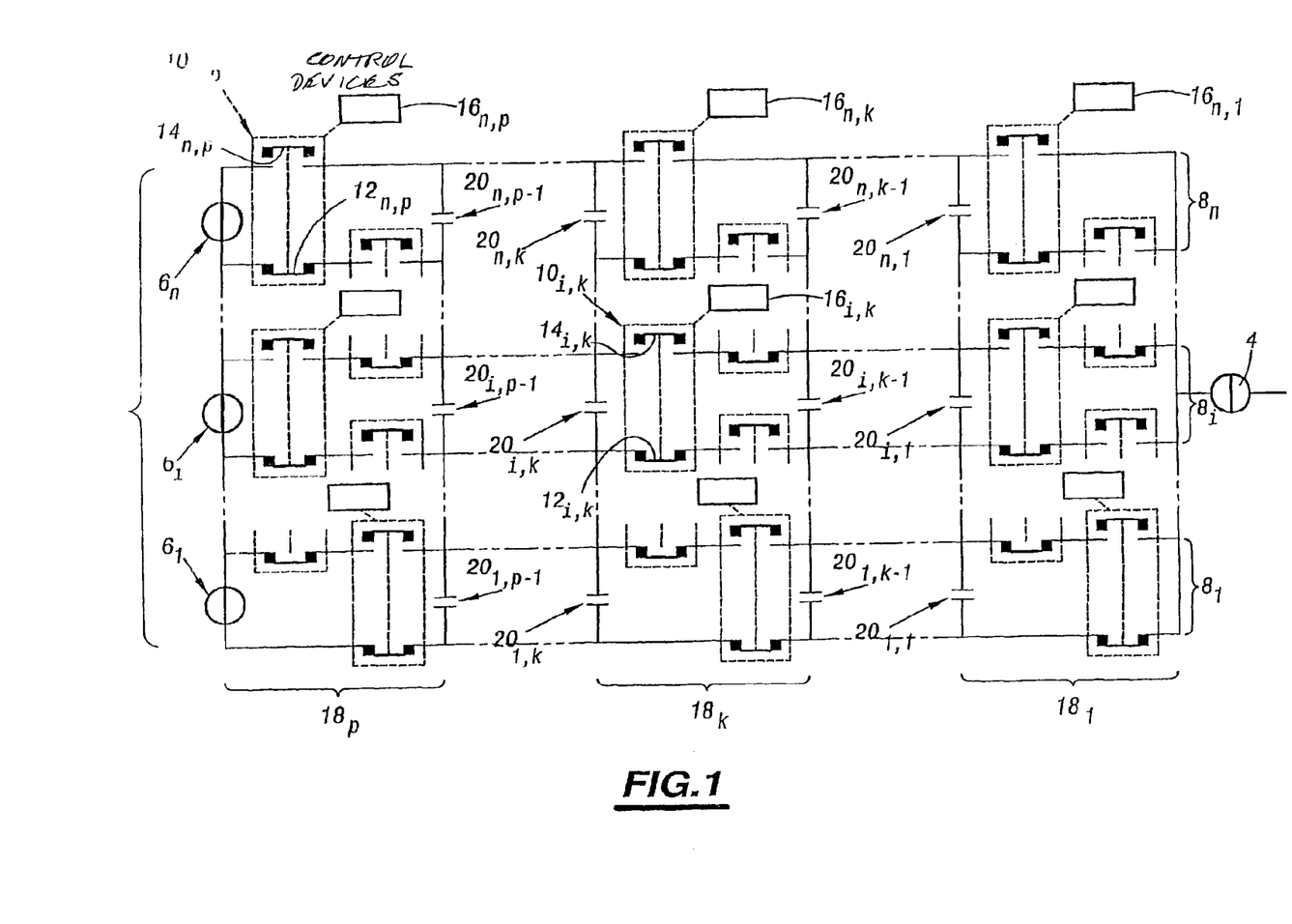
FIG. 1 shows an electrical block diagram of a conversion device according to the invention in the more general case, in which the control unit is not shown.

The device for reversible conversion of electrical energy which is shown in FIG. 1 has a DC voltage source 2 ensuring a potential difference of value E between its terminals and a current source 4 delivering a direct or alternating current I according to the application envisaged.

Thus, for example, when the current source delivers a symmetrical alternating current the conversion device corresponds to a voltage inverter or, taking account of the reversibility, to a current rectifier. The following description always assumes this particular case.

The voltage source consists of n secondary voltage sources $6_1, \ldots, 6_n$ connected in series and each defining between its terminals n successive stages $8_1, \ldots, 8_n$. Any secondary source $6_i$ is for example constituted by a capacitor and maintains a partial voltage $$\frac{E}{n}$$

between its terminals. In the following, the stages are numbered in the increasing order of the potential levels to which they are connected on the voltage source side.

Each stage $8_i$ has p switching cells $10_{i1}, \ldots, 10_{ip}$. Each switching cell $10_{ii}$ is constituted by two switches $12_{ik}$ and $14_{ik}$ kept in opposite states by a device $16_{ik}$ for controlling the switching thereof connected to the cell $10_{ik}$. The control devices form part of a control unit which will be described in detail during the description of FIG. 2.

Thus the n stages define n+1 groups of switches, each of the said groups being connected by one end to the current source and by the other end to one of the n+1 potential levels of the series of secondary voltage sources $6_1, \ldots, 6_n$. As for the stages, the groups of switches are numbered in the increasing order of the potential levels to which they are connected on the side of the secondary voltage sources. Thus the first group is connected to the terminal of the voltage source 2 with the lowest potential and the last group is connected to the terminal of the voltage source 2 with the highest potential.

The first group of switches is constituted by the switches $12_{1,1}, \ldots, 12_{1,p}$ of the switching cells of the first stage, connected in series. The (n+1)-th group of switches is constituted by the switches $14_{n,1}, \ldots, 14_{n,p}$ of the p switching cells of the n-th stage, connected in series. The i-th group of switches, with 1<i[n, is constituted by the switches $12_{i,1}, \ldots, 12_{i,p}$ of the p switching cells of the i-th stage and the switches $14_{i-1,1}, \ldots, 14_{i-1,p}$ of the p switching cells of the (i-1)-th stage, connected alternately in series.

In this way, p ranks $18_1, \ldots, 18_p$ are defined transversely with respect to the n stages, each rank $18_k$ having n switching cells, that is to say $10_{1,k}, \ldots, 10_{n,k}$.

Between two successive ranks $18_k$ and $18_{k+1}$, n capacitors of rank k, $10_{1,k}, \ldots, 20_{n,k}$, are connected in series at the rate of one per stage. Thus at the i-th stage the capacitor $20_{i,k}$ is connected, on the one hand, to the i-th group of switches and, on the other hand, to the (i+1)th group of switches. Moreover, each capacitor is adapted to maintain between its terminals a load voltage increasing as a function of its rank k and representing a fraction of the partial voltage of the secondary voltage source of the stage to which it belongs. For example, a distribution of these load voltages which is proportional to the rank of each capacitor $20_{i,k}$, $$E_{i,k} = \frac{kE}{pn},$$

guarantees at the terminals of the open switches a voltage difference less than or equal to $$\frac{E}{pn}.$$

Figure 2:
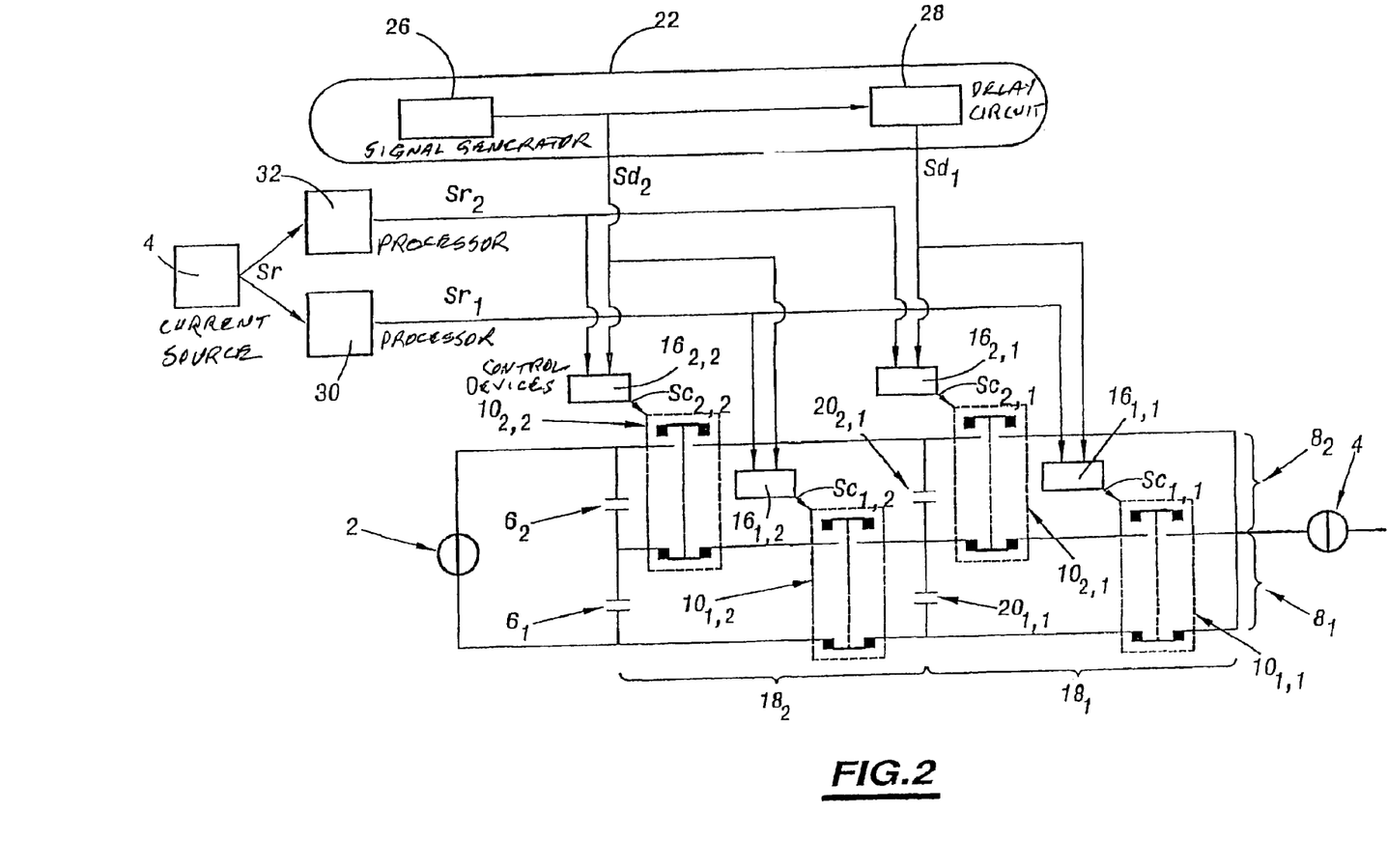
FIG. 2 shows an electrical block diagram of a conversion device according to the invention in the case where it has two stages and two cells per stage, also detailing a control unit for this device.

The conversion device shown in FIG. 2 is a particular case of the device described previously, in an embodiment of the invention adapted for use with a DC voltage source and an alternating current source of frequency $f_i$. It has two stages $8_1$ and $8_2$ and two ranks $18_1$ and $18_2$.

E is the voltage of the DC voltage source 2 which loads two capacitors $6_1$ and $6_2$ each constituting a secondary voltage source for each stage, with partial voltage $$\frac{E}{2}.$$

Between the two ranks $18_1$ and $18_2$ two capacitors $20_{1,1}$ and $20_{2,1}$ are connected in series as described previously and are dimensioned so as to support a load voltage as a function of their rank (k=1), with a value of $$E_{1,1} = E_{2,1} = \frac{E}{4}.$$

The device also has four switching cells $10_{1,1}, 10_{1,2}, 10_{2,1}, 10_{2,2}$ controlled respectively by four control devices $16_{1,1}, 16_{1,2}, 16_{2,1}, 16_{2,2}$. These four control devices are synchronised and deliver logic control signals at a frequency F which are adapted to ensure the switching to opposite states of the two switches of each cell.

In the embodiment described here, the frequency F is clearly higher than the frequency $f_i$ and is chosen to represent more precisely a multiple of $f_i$ for the sake of simplicity.

Each control device has for example a comparator of which the logic state at the output is the result of the comparison of two signals of which one comes from a synchronisation module 22 and the other comes from an operating generator 24.

Therefore the control device $16_{i,k}$ supplies at the output a control signal $sc_{i,k}$ of which the value determines the state of the switching cell $10_{i,k}$. Thus, for example, when the control signal $sc_{i,k}$ is equal to 1, the switch $12_{i,k}$ of the switching cell $10_{i,k}$ is blocked and the switch $14_{i,k}$ of this same cell is passing. Conversely, when the control signal $sc_{i,k}$ is equal to 0, the switch $12_{i,k}$ of the switching cell $10_{i,k}$ is passing and the switch $14_{i,k}$ of this same cell is blocked. The simultaneous control of the two switches of one and the same cell to opposing states will not be described in greater detail here as it is considered as known in the prior art.

The synchronisation module 22 comprises means 26 for generating symmetrical alternating triangular signals of frequency F as well as a delay circuit 28 which generate two signals $sd_1$ and $sd_2$ offset by a time difference equal to $$\frac{1}{2F}$$

and supplying respectively the first rank control devices $16_{1,1}, 16_{2,1}$ and the second rank control devices $16_{1,2}, 16_{2,2}$.

The operating generator 24 for its part delivers a symmetrical alternating reference signal sr of frequency $f_i$ identical to the frequency of the current source 4.

This reference signal is processed at the output of the operating generator 24 by two processing modules respectively 30 and 32 of the first and second stage, in order to supply respectively at the output two secondary reference signals $sr_1$ and $sr_2$. These two signals $sr_1$ and $sr_2$ supply respectively the first stage control devices $16_{1,1}, 16_{2,1}$ and the second stage control devices $16_{1,2}, 16_{2,2}$.

For good operation of the conversion device, the signals $sr_1$ and $sr_2$ verify the following two relationships:

$$sr_1+sr_2=2sr, \quad sr_1 \wedge sr_2.$$

The two processing modules 30 and 32 which permit the supply of such signals from the reference signal sr are considered as conventional and therefore will not be described in detail below.

Figure 3:
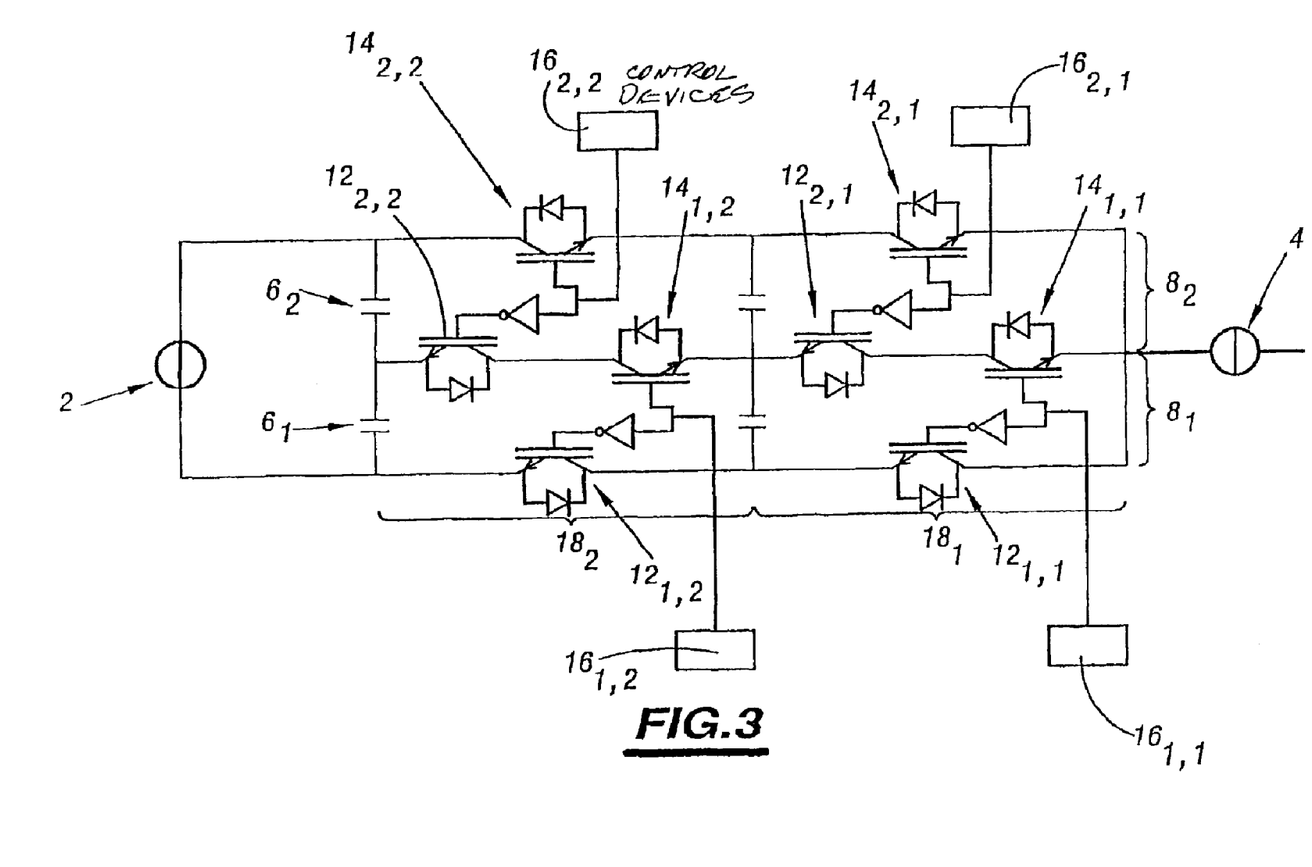
FIG. 3 shows an electrical diagram detailing an embodiment of the switching cells of the conversion device shown in FIG. 2.

As shown in FIG. 3, the switches of the converter are all of the same type, that is to say bidirectional in current and unidirectional in voltage and are formed by IGBT transistors each associated with a diode in antiparallel. Depending upon the applications, each of these IGBT transistors can be replaced by a bipolar Darlington, MOST, GTO, etc. transistor.

In this embodiment it will be noted that the four switches of the first and last groups are capable of supporting a voltage double that supported by the four switches of the second group. This poses a problem of heterogeneous dimensioning of the switches of the conversion device. In order to solve this problem, it is preferable to replace each of the four switches of the first and last groups by two identical switches connected in series and positioned in the same state at each instant, which does not in any way modify the operation of the device.

Figure 4:
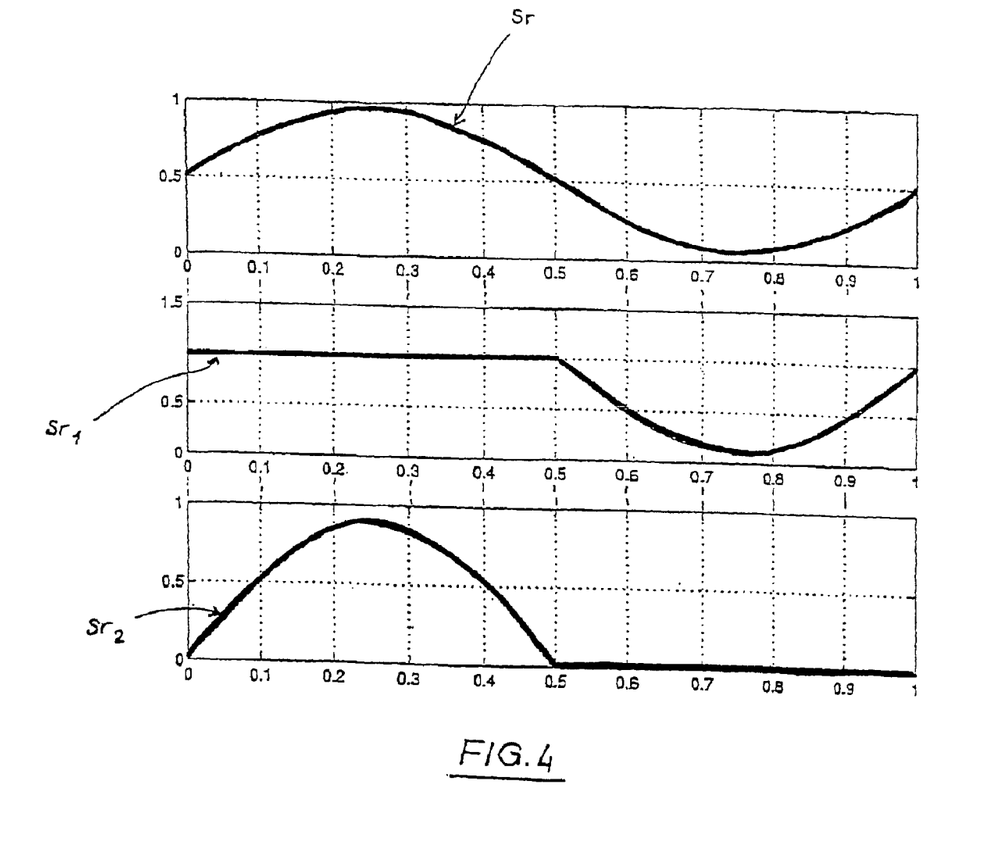
FIG. 4 shows the behaviour of the reference signals of a control unit of the conversion device shown in FIG. 2.

FIG. 4 shows the behaviour of the reference signal sr and of the secondary reference signals $sr_1$ and $sr_2$ in the chosen embodiment, that is to say for a DC voltage source and an alternating current source of frequency $f_i$.

The signal sr is here represented without unit, as the sum of a continuous signal with a value 0.5 and a sinusoidal signal with an amplitude substantially lower than 0.5 and with a frequency $f_1$ normalised at 1. The signal $sr_1$ is then defined by the following relationship:

$$\begin{cases} sr_1 = 2 \times sr, & \text{if } sr [ 0.5 \\ sr_1 = 1, & \text{if } sr \wedge 0.5 \end{cases}$$

The signal $sr_2$ for its part is defined by the relationship:

$$\begin{cases} sr_2 = 0, & \text{if } sr [ 0.5 \\ sr_2 = 2 \times sr - 1, & \text{if } sr \wedge 0.5 \end{cases}$$

It is easily verified that thus, at any instant, the two conditions $sr_1+sr_2=2sr$ and $sr_1 \wedge sr_2$ are verified.

Figure 5:
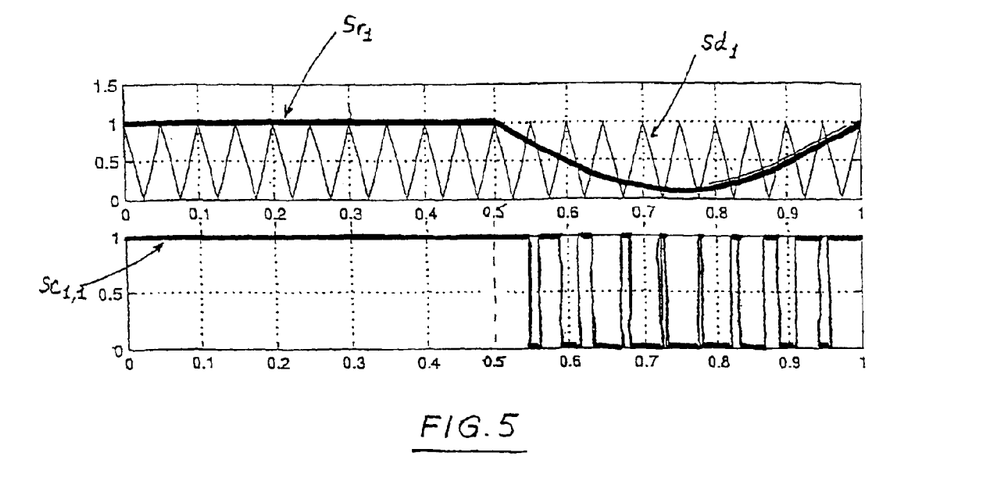
FIG. 5 shows the behaviour of the input and output signals of a first control device of the conversion device shown in FIG. 2.

FIG. 5 shows, on the one hand, the behaviour of the two signals $sr_1$ and $sd_1$ supplied at the input of the control device $16_{1,1}$ and, on the other hand, the behaviour of the control signal $sc_{1,1}$ supplied at the output of the same control device $16_{1,1}$, as a function of the signals supplied at the input.

The signal $sd_1$ is a triangular signal with an amplitude varying between 0 and 1 and a frequency F which here has the value $20f_i$. The resulting signal $sc_{1,1}$ is a square wave signal of zero value when the relationship $sd_1>sr_1$ is verified and of unit value when the relationship $sd_1<sr_1$ is verified.

Figure 6:
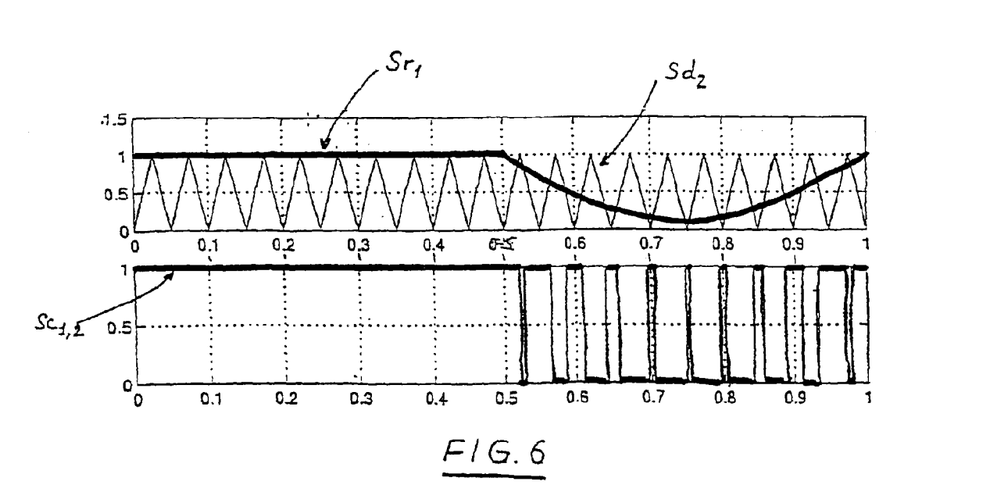
FIG. 6 shows the behaviour of the input and output signals of a second control device of the conversion device shown in FIG. 2.

FIG. 6 shows, on the one hand, the behaviour of the two signals $sr_1$ and $sd_2$ supplied at the input of the control device $16_{1,2}$ and, on the other hand, the behaviour of the control signal $sc_{1,2}$ supplied at the output of the same control device $16_{1,2}$, as a function of the signals supplied at the input.

The signal $sd_2$ is a triangular signal with an amplitude varying between 0 and 1 and a frequency F, offset by a time difference equal to $$\frac{1}{2F}$$

relative to the signal $sd_1$. The signal $sc_{1,2}$ is then a square wave signal of zero value when the relationship $sd_2>sr_1$ is verified and of unit value when the relationship $sd_2<sr_1$ is verified.

Figure 7:
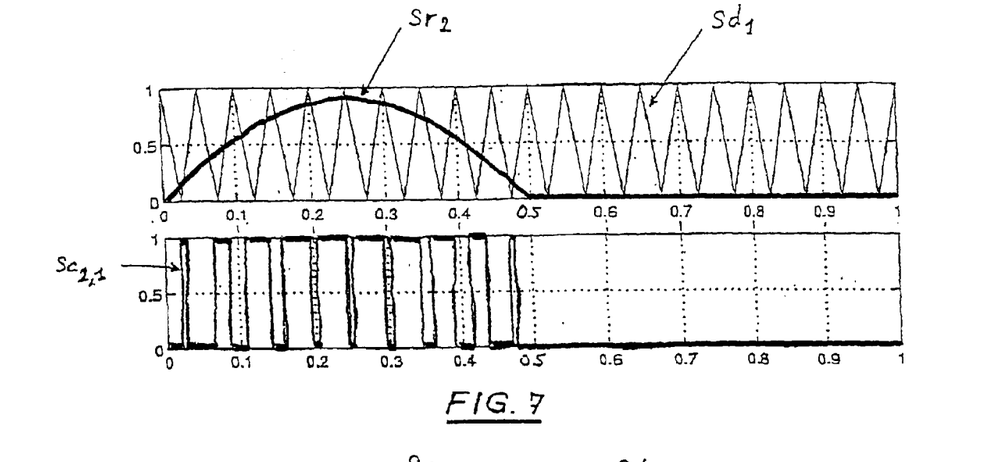
FIG. 7 shows the behaviour of the input and output signals of a third control device of the conversion device shown in FIG. 2.

FIG. 7 shows, on the one hand, the behaviour of the two signals $sr_2$ and $sd_1$ supplied at the input of the control device $16_{2,1}$ and, on the other hand, the behaviour of the control signal $sc_{2,1}$ supplied at the output of the same control device $16_{2,1}$, as a function of the signals supplied at the input.

The signal $sc_{1,1}$ is then a square wave signal of zero value when the relationship $sd_1>sr_2$ is verified and of unit value when the relationship $sd_1<sr_2$ is verified.

Figure 8:
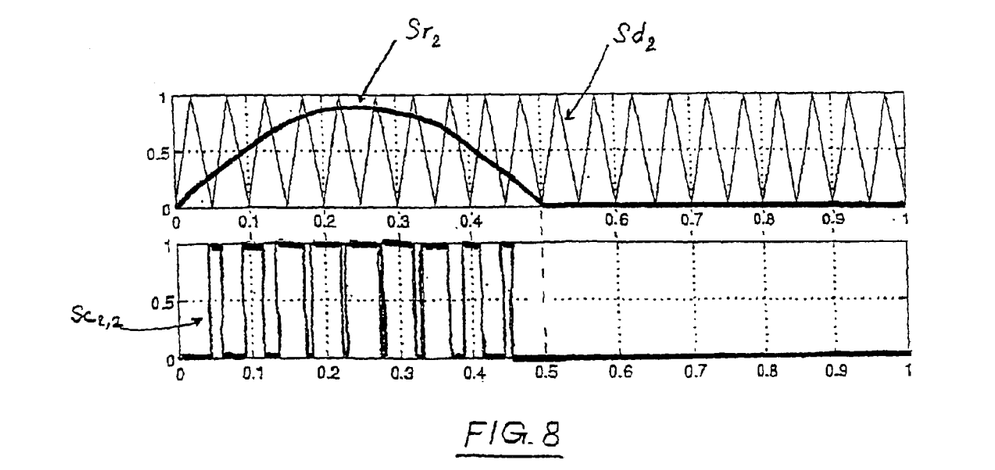
FIG. 8 shows the behaviour of the input and output signals of a fourth control device of the conversion device shown in FIG. 2.

FIG. 8 shows, on the one hand, the behaviour of the two signals $sr_2$ and $sd_2$ supplied at the input of the control device $16_{2,2}$ and, on the other hand, the behaviour of the control signal $sc_{2,2}$ supplied at the output of the same control device $16_{2,2}$, as a function of the signals supplied at the input.

The signal $sc_{2,2}$ is then a square wave signal of zero value when the relationship $sd_2>sr_2$ is verified and of unit value when the relationship $sd_2<sr_2$ is verified.

Figure 9:
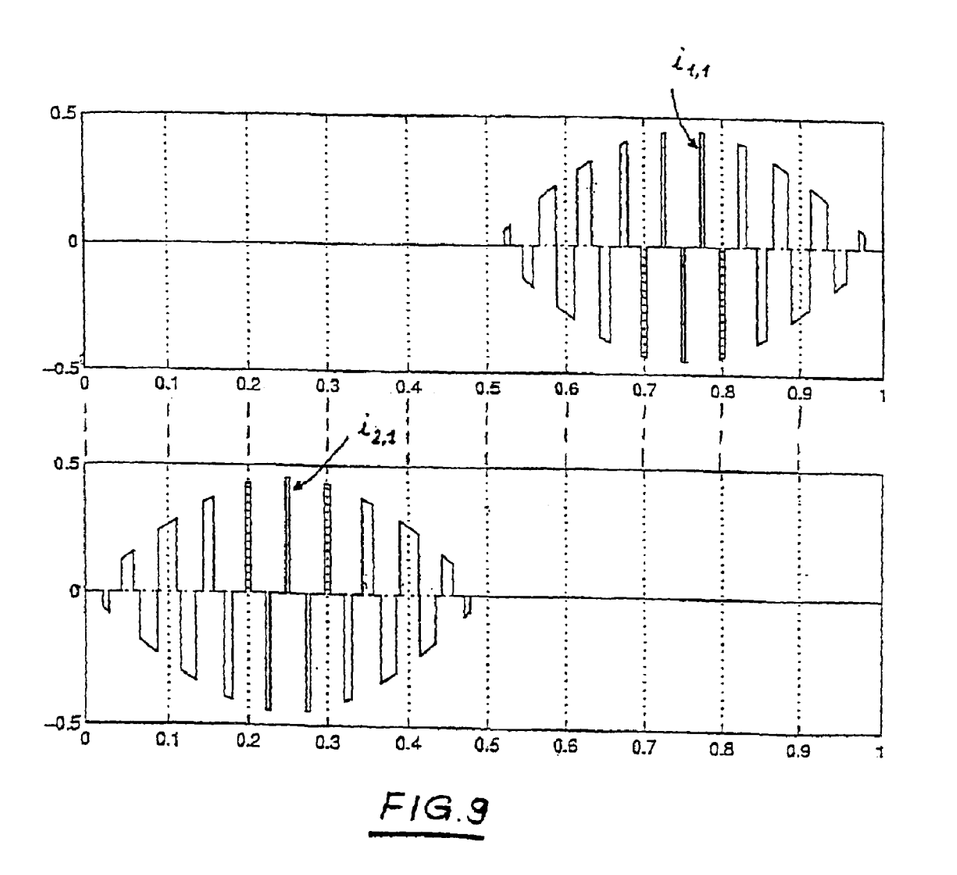
FIG. 9 shows the behaviour of the currents circulating through two capacitors of the first and second stages respectively, of the conversion device shown in FIG. 2.

FIG. 9 shows the behaviour of the currents $i_{1,1}$ and $i_{2,1}$ which pass respectively through the two capacitors $20_{1,1}$ and $20_{2,1}$.

The value of these currents is directly linked to the synchronisation of the control devices, as described previously, and thus is controlled so as to have an average zero value over a period $$\frac{1}{F}$$

in such a way as to ensure a constant average voltage of $$\frac{E}{4}$$

at the terminals of the capacitors $20_{1,1}$ and $20_{2,1}$.

Figure 10:
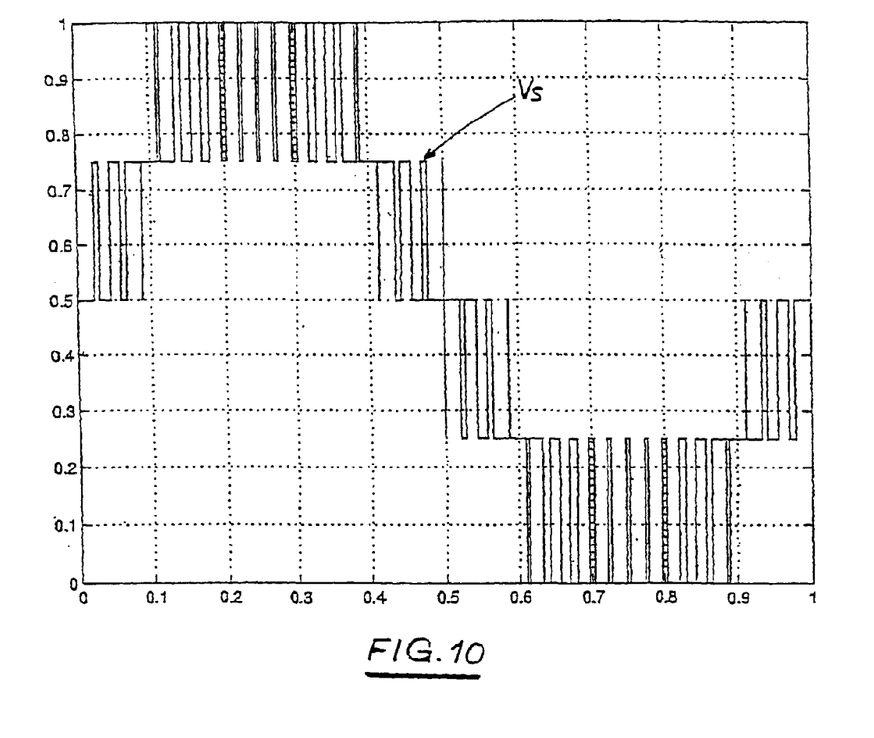
FIG. 10 shows the behaviour of the standardised output voltage of the conversion device shown in FIG. 2.

FIG. 10 shows the behaviour of the standardised output voltage Vs of the conversion device. This is measured between the lowest potential level of the voltage source 2 and the terminal of the current source 4 connected to the energy conversion device.

The output voltage has a ripple of frequency 2F and of amplitude $$\frac{E}{4};$$

these two conditions facilitate the filtering of this voltage.

Figure 11:
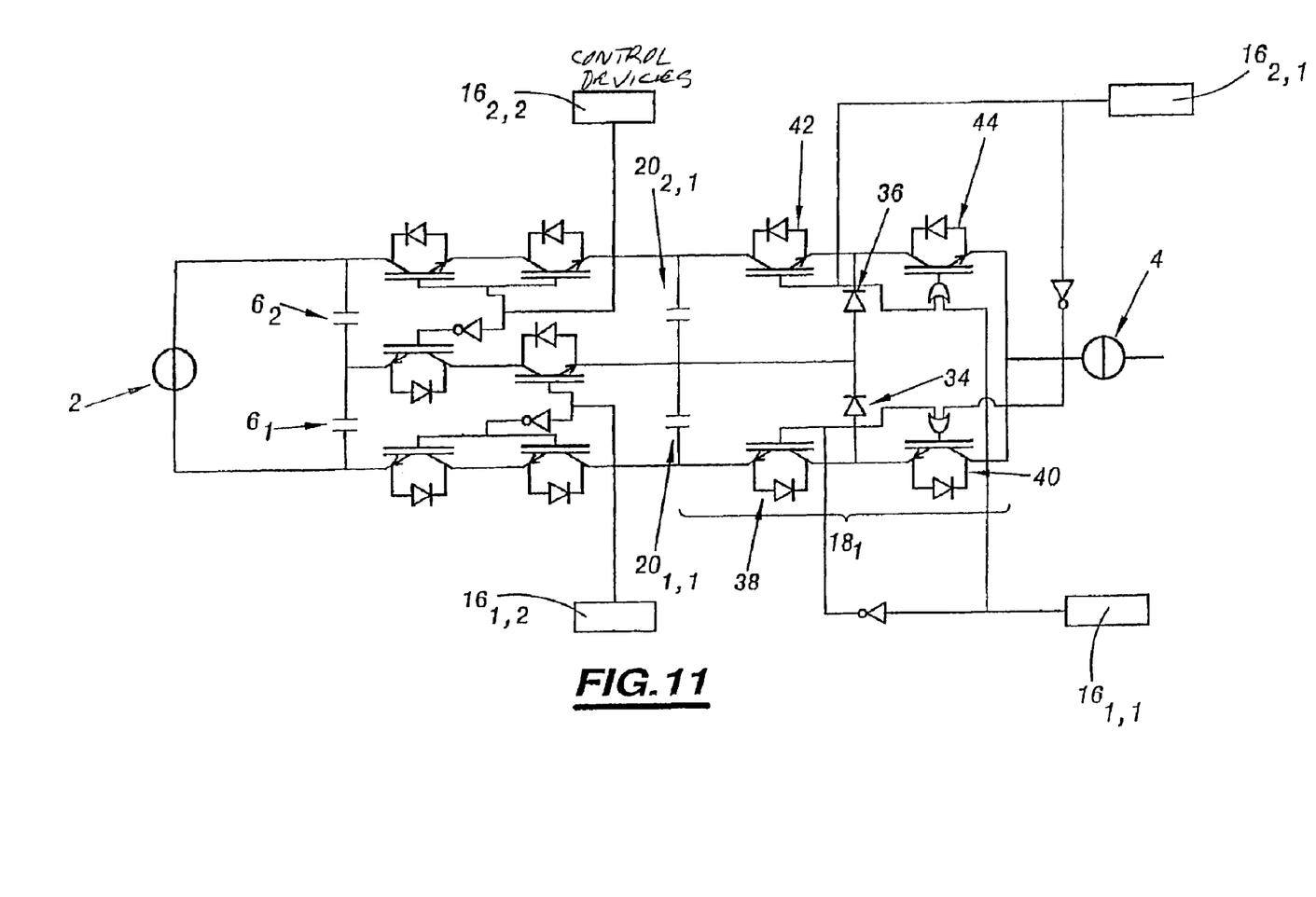
FIG. 11 shows an electrical diagram of a conversion device with two stages and two cells per stage, according to another possible embodiment of the invention.

An energy conversion device with two ranks and two stages according to another possible embodiment of the invention is shown in FIG. 11.

The switches of the first and third groups each have two components forming switches. By contrast, the intermediate group of switches only appears in the second rank. In the first rank $18_1$ a first diode 34 is connected, on the one hand, to a point situated between the two components 38 and 40 of the first group and of the first rank and, on the other hand, to a point situated between the two capacitors $20_{1,1}$ and $20_{2,1}$.

Likewise a second diode 36 is connected, on the one hand, to a point situated between the two capacitors $20_{1,1}$ and, on the other hand, to a point situated between the two components 42 and 44 of the third group and of the first rank.

This embodiment includes a control unit which is substantially different from the control unit described previously in so far as the control of the first rank $18_1$ is concerned. However, this new control unit can be deduced in a conventional manner from the one previously described in FIG. 2 with the aid of a simple combination of the control devices $16_{1,1}$ and $16_{2,1}$ of the switching cells of the first rank $18_1$.

For good operation of the device, the component 38 situated on the first group, between the capacitor $20_{1,1}$ and the diode 34, receives at the input a control signal equal to $\overline{sc_{1,1}}$, complement to 1 of the signal $sc_{1,1}$, where $sc_{1,1}$ is the signal shown in FIG. 5.

The component 40 situated on the first group, between the diode 34 and the current source 4, receives at the input a control signal equal to $\overline{(sc_{1,1}+sc_{2,1})}$, where $sc_{2,1}$ is the signal shown in FIG. 7 and where the symbol "+" represents the logic operation "or".

The component 42 situated on the third group, between the capacitor $20_{2,1}$ and the diode 36, receives at the input a control signal equal to $sc_{2,1}$.

The component 44 situated on the third group, between the diode 36 and the current source 4, receives at the input a control signal equal to $(sc_{1,1}+sc_{2,1})$.

In this way there is equivalence between this conversion device and that shown in FIG. 3, their operation being identical for all the possible configurations of the control signals $sc_{1,1}$ and $sc_{2,1}$ of the first rank $18_1$.

In fact, for the conversion device shown in FIG. 3, when $sc_{1,1}=0$ and $sc_{2,1}=0$, the switch $12_{1,1}$ is passing, the switch $14_{1,1}$ is blocked, the switch $12_{2,1}$ is passing and the switch $14_{2,1}$ is blocked. Thus in the first rank $18_1$ the current circulates through the first group of switches, directly connecting the current source 4 to the terminal of lower potential of the capacitor $20_{1,1}$.

For the conversion device shown in FIG. 11, when $sc_{1,1}=0$ and $sc_{2,1}=0$, $\overline{sc_{1,1}}=1$ therefore the switch 38 is passing, $\overline{sc_{1,1}+sc_{2,1}}=1$ therefore the switch 40 is passing, $sc_{2,1}=0$ therefore switch 42 is blocked and $sc_{1,1}+sc_{2,1}=0$ therefore the switch 44 is blocked. Thus, just as in the preceding case, the terminal of lower potential level of the capacitor $20_{1,1}$ is connected directly to the current source 4 and the current circulates between these two terminals.

It will be noted that the current takes the same path through the two energy conversion devices shown in FIGS. 3 and 11 when $sc_{1,1}=1$ and $sc_{2,1}=1$.

It will also be noted that the configuration $sc_{1,1}=0$ and $sc_{2,1}=1$ is an impossible configuration, since it puts the two capacitors $20_{1,1}$ and $20_{2,1}$ of the energy conversion devices of FIGS. 3 and 11 into short-circuit.

Finally, for the energy conversion device shown in FIG. 3, when $sc_{1,1}=1$ and $sc_{2,1}=0$ the switch $12_{1,1}$ is blocked, the switch $14_{1,1}$ is passing, the switch $12_{2,1}$ is passing and the switch $14_{2,1}$ is blocked. Thus the current circulates through the second group in the first rank $18_1$, directly connecting the point situated between the two capacitors $20_{1,1}$ and $20_{2,1}$ and the current source 4.

For the conversion device shown in FIG. 11, when $sc_{1,1}=1$ and $sc_{2,1}=0$, $\overline{sc_{1,1}}=0$ therefore the switch 38 is blocked, $\overline{sc_{1,1}+sc_{2,2}}=1$ therefore the switch 40 is passing, $sc_{1,1}+sc_{2,1}=1$ therefore the switch 44 is passing and $sc_{2,1}=0$ therefore the switch 42 is blocked. Thus, as previously, in the first rank $18_1$ the current circulates between the point situated between the two capacitors $20_{1,1}$ and $20_{2,1}$ and the current source 4. However, its path is slightly different from the path followed by the current in the device shown in FIG. 3, since it passes through the diode 36 and the switch 44 when it circulates from the point situated between the two capacitors $20_{1,1}$ and $20_{2,1}$ towards the current source 4 and through the closed switch 40 and the diode 34 when it circulates from the current source 4 towards the point situated between the two capacitors $20_{1,1}$ and $20_{2,1}$.

This latter configuration shows that the analogy between the two devices is only possible because they only differ by their rank $18_1$ for which there is no capacitor between the switch $14_{2,1}$ (or the switch $12_{1,1}$) and the current source.

Thus this embodiment permits further reduction in the volume and above all the cost of the conversion device, but the improvement can only be made to the first rank $18_1$.

It is clear that a device for conversion of electrical energy according to the invention has the advantage of being less bulky than the conventional multi-cell devices, which extends its field of use to even higher voltage levels.

In fact, a conventional device with N=np cells necessitates np−1 capacitors which must be dimensioned so as to support up to $$\frac{(np-1)E}{np}.$$

On the other hand, a device according to the invention with N=np cells (n stages, p ranks) necessitates n(p−1)=np−n capacitors dimensioned so as to support a voltage which cannot exceed $$\frac{(p-1)E}{np},$$

which is clearly lower than the load referred to in the previous case.

Consequently a device according to the invention has a volume and therefore a price which is less than that of a conventional device with equivalent performance.

It will be noted that the invention is not limited to the embodiment described.

Thus, as a variant the switches of the intermediate groups of index i with 1<i[n are not necessarily connected in alternate series as described in the chosen embodiment. The switches $12_{i,k}$ and $14_{i-1,k}$ of the i-th intermediate group and of the k-th rank can be connected in parallel. In this case the switches in question must be bidirectional in voltage and unidirectional in current.

Equally as a variant, the frequency F is not a multiple of $f_i$ and can even be chosen to be substantially equal to $f_i$ for certain applications.

What is claimed is:

1. Device for reversible conversion of electrical energy, comprising:
   a DC voltage source (2) connection to a DC voltage source with a voltage;
   a current source connection connecting to a current source (4);
   at least two parallel-connected stages ($8_i$) connecting the DC voltage source connection with the current source connection,
   the at least two stages comprising a first stage and a last stage,
   each stage comprising at least two switching cells ($10_{i,k}$) and a capacitor ($20_{i,k}$) connected in parallel between adjacent ones of the switching cells of each stage,
   each switching cell comprising two switches ($12_{i,k}$, $14_{i,k}$),
   each capacitor sized to maintain between homologous terminals of the two switches of each switching cell a load voltage equal to a fraction of the voltage of the DC voltage source (2),
   control devices ($16_{i,k}$), each control device connected to a corresponding one of the switching cells ($10_{i,k}$) and to control switching of the two switches ($12_{i,k}$, $14_{i,k}$) of the corresponding one switching cell whilst ensuring opposite states for said two switches,
   operating means (22, 24, 30, 32) for operating the control devices to supply a reference signal for a desired voltage conversion,
   wherein said at least two stages define two end groups of switches and at least one intermediate group of switches, the intermediate group of switches comprising switches common to two successive adjacent stages,
   each of the two end groups of switches comprising respectively the switches of each switching cell belonging respectively to the first and last stages,
   the intermediate group comprising series connected pairs of switches ($12_{i,k}$, $14_{i-1,k}$) of switching cells belonging to two adjacent stages, and
   the capacitors ($20_{1,k}$, ..., $20_{n,k}$) of the adjacent stages ($18_k$) being connected transversely in series between the two end groups.

2. Device for reversible conversion of electrical energy as claimed in claim 1, wherein each of the pairs of switches of the intermediate group comprises series-connected switches ($12_i$, $14_{i,k}$) from switching cells belonging alternately to two adjacent stages, said switches of the intermediate group being unidirectional in voltage and bidirectional in current.

3. Device for reversible conversion of electrical energy as claimed in claim 1, wherein the two switches ($12_{i,k}$, $14_{i-1,k}$) of each of the said pairs of switches of the intermediate group are connected in parallel and are bidirectional in voltage and unidirectional in current.

4. Device for reversible conversion of electrical energy as claimed in claim 1, wherein,
   the switches ($12_{i,k}$, $14_{i,k}$) of the switching cells are formed of components all identical and series-connected.

5. Device for reversible conversion of electrical energy as claimed in claim 1, wherein the operating means (22, 24, 30, 32) include means (30, 32) for processing the reference signal so as to deliver at the output a plurality of secondary reference signals, and means for transmission of each secondary reference signal to all the switching cell control devices of a same stage.

6. Device for reversible conversion of electrical energy as claimed in claim 5, wherein the processing means (30, 32) are adapted to deliver the plurality of secondary reference signals at values proportional to the value of the reference signal,
   each secondary reference signal of a stage situated between two given potential levels on the voltage source (2) side, having a value higher than the value of a secondary reference signal of a stage situated between two higher potential levels on the voltage source (2) side.

7. Device for reversible conversion of electrical energy as claimed in claim 1, wherein the device has two stages ($8_1$, $8_2$).

8. Device for reversible conversion of electrical energy as claimed in claim 7, wherein a part of the device situated between the two capacitors ($20_{1,1}$, $20_{2,1}$) closest to the current source (4) connection and the current source connection itself (4) includes two components forming series-connected switches (38, 40, 42, 44) on each of the first and last groups and two diodes (34, 36) connected at a point situated between the said two capacitors and at a point situated between the said two components of the first and last groups respectively.

9. Device for reversible conversion of electrical energy as claimed in claim 7, wherein each stage ($8_1$, $8_2$) includes two switching cells.

10. Device for reversible conversion of electrical energy as claimed in claim 7, wherein,
- each stage ($8_1$, $8_2$) includes three switching cells and two capacitors,
- a first of the two capacitors ($20_{i,k}$) is connected in parallel between a first of the three switching cells,
- a second of the two capacitors is connected in parallel between the second of the three switching cells and an adjacent third of the three switching cells,
- the first of the two capacitors is closer to the current source than the second of the two capacitors,
- the second of the two capacitors sized to maintain a greater load voltage equal than the first of the two capacitors closer to the current source.

11. A reversible electrical energy conversion device, comprising:
- a voltage source comprising plural series-connected secondary voltage sources ($6_1$, ..., $6_n$), each secondary voltage source having a first terminal and a second terminal, the second terminal of one secondary voltage source being connected to a first terminal of another secondary voltage source;
- a current source;
- N stages ($8_1$, ..., $8_n$) parallel-connected between the voltage source and the current source, each stage having a first line connected to the first terminal of a corresponding one of the secondary voltage sources, N being a natural number greater than 1, the N stages including a first stage and a second stage;
- each stage ($8_i$) comprising plural parallel-connected switching cells ($10_{i1}$, ..., $10_{ip0}$) and a capacitor ($20_{i,k}$) connected in parallel between adjacent switching cells of each stage,
- each switching cell ($10_{ik}$) comprising two switches ($12_{ik}$ and $14_{ik}$) kept in opposite states; and
- a control device ($16_{ik}$) connected to the two switches of each switching cell, the control device keeping the two switches in the opposite states, wherein,
- the switches of the plural switching cells of the N stages define M parallel-connected switch groups, M=N1,
- the M parallel-connected switch groups comprising a first outside switch group, a second outside switch group, and an interior switch group :Located intermediate the first and second outside switch groups,
- each switch group comprising a first group end and a second group end,
- each of the M switch groups connected at the first group end to the current source and at the second group end to a different one of the terminals of the secondary voltage sources,
- the first switch group comprising switches only from the first stage,
- the second switch group comprising switches only from the second stage, and
- the interior switch group comprising switches from two successive adjacent stages.

12. A reversible electrical energy conversion device, comprising:
- a voltage source comprising plural series-connected secondary voltage sources ($6_1$, ..., $6_n$), each secondary voltage source having a first terminal and a second terminal, the second terminal of one secondary voltage source being connected to a first terminal of another secondary voltage source;
- a current source terminal; and
- N stages ($8_1$, ..., $8_n$) parallel-connected between the voltage source and the current source terminal, each stage having a first line connected to a corresponding one of the secondary voltage sources, N being a natural number greater than 1, the N stages including a first stage and a second stage,
- each stage ($8_i$) comprising plural parallel-connected switching cells ($10_{i1}$, ..., $10_{ip0}$) and a capacitor ($20_{i,k}$) connected in parallel between adjacent switching cells,
- each switching cell ($10_{ik}$) comprising two switches ($12_{ik}$ and $14_{ik}$) in opposite states, wherein,
- the switches of the plural switching cells of the N stages define M parallel-connected switch groups, M=N1,
- the M parallel-connected switch groups comprising a first outside switch group, a second outside switch group, and an interior switch group located intermediate the first and second outside switch groups,
- each switch group comprising a first group end and a second group end,
- each of the M switch groups connected at the first group end to the current source and at the second group end to a different one of the terminals of the secondary voltage sources,
- the first switch group comprising switches only from the first stage,
- the second switch group comprising switches only from the second stage, and
- the interior switch group comprising switches from two successive adjacent stages.

13. The device of claim 12, further comprising:
a control device ($16_{ik}$) connected to the two switches of each switching cell, the control device keeping the two switches in the opposite states.

14. The device of claim 12, wherein,
the intermediate switch group comprises series-connected pairs of switches ($12_{ik}$, $14_{i-1,k}$) of switching cells belonging to the two adjacent stages.

15. The device of claim 14, wherein,
each of the pairs of switches, of the intermediate group, comprises series-connected switches ($12_i$, $14_{i,k}$) from switching cells belonging to the two adjacent stages,
said series-connected switches of the intermediate group being unidirectional in voltage and bidirectional in current.

16. The device of claim 14, wherein, wherein the two switches ($12_{i,k}$, $14_{i-1,k}$) of each of the said pairs of switches of the intermediate group are connected in parallel and are bidirectional in voltage and unidirectional in current.

17. The device of claim 12, wherein the device has exactly two stages ($8_1$, $8_2$).

18. The device of claim 17, wherein each stage ($8_1$, $8_2$) includes exactly two switching cells.

19. The device of claim 12, wherein each stage ($8_1$, $8_2$) includes three switching cells and two capacitors, each of the two capacitors positioned parallel and intermediate two adjacent switching cells.

* * * * *